United States Patent
Lee

(10) Patent No.: US 7,855,377 B2
(45) Date of Patent: Dec. 21, 2010

(54) ALIGNMENT STRUCTURES FOR AN OPTICAL ASSEMBLY

(75) Inventor: Michael G. Lee, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 12/185,881

(22) Filed: Aug. 5, 2008

(65) Prior Publication Data

US 2010/0032553 A1    Feb. 11, 2010

(51) Int. Cl.
*G01N 21/86* (2006.01)
*G01J 1/42* (2006.01)

(52) U.S. Cl. ............... 250/559.3; 250/227.11

(58) Field of Classification Search .......... 250/221, 250/214 R, 559.3, 551, 239, 227.22, 227.21, 250/216; 385/51, 52; 356/618, 619, 621; 257/433

See application file for complete search history.

(56) References Cited

U.S. PATENT DOCUMENTS

| | | | |
|---|---|---|---|
| 6,611,635 B1 | 8/2003 | Yoshimura et al. | 385/14 |
| 6,684,007 B2 | 1/2004 | Yoshimura et al. | 385/31 |
| 6,690,845 B1 | 2/2004 | Yoshimura et al. | 385/14 |
| 7,092,603 B2 * | 8/2006 | Glebov et al. | 385/51 |
| 7,418,165 B2 | 8/2008 | Glebov et al. | 385/14 |
| 7,468,558 B2 * | 12/2008 | Bakir et al. | 257/773 |
| 2004/0008952 A1 * | 1/2004 | Kragl | 385/88 |
| 2005/0207693 A1 | 9/2005 | Yokouchi | 385/14 |
| 2006/0208165 A1 | 9/2006 | Lee et al. | 250/214 R |

\* cited by examiner

*Primary Examiner*—Que T Le
*Assistant Examiner*—Pascal M Bui-Pho
(74) *Attorney, Agent, or Firm*—Baker Botts L.L.P.

(57) ABSTRACT

An optical assembly is provided that includes a substrate. The substrate has one or more optical waveguides. A component is coupled to and spaced apart from the substrate. The component has one or more photodetectors. One or more flexible optical pillars is disposed between the optical waveguides and the photodetectors. The flexible optical pillars are aligned by one or more alignment structures. The flexible optical pillars are optically transmissive and configured to transmit light from the optical waveguides to the photodetectors.

7 Claims, 4 Drawing Sheets

ALIGNMENT STRUCTURES FOR AN OPTICAL ASSEMBLY

TECHNICAL FIELD

This invention relates generally to optical devices and, more particularly, to improving alignment tolerances for an optical assembly.

BACKGROUND

Surface mount technology (SMT) for assembly of optical devices on various substrates is considered a reliable and cost effective technique. However, any displacement of components within an optical assembly may cause optical power loss, which can deteriorate the performance of the optical assembly. For example, a lateral shift may be caused by mechanical or thermal stresses, such as those caused by a coefficient of thermal expansion (CTE) mismatch. Such lateral shift may lead to misalignment of optical components, causing optical signal degradation or failure.

SUMMARY OF THE DISCLOSURE

The present invention provides a method and system that substantially eliminates or reduces at least some of the disadvantages and problems associated with previous methods and systems.

According to one embodiment of the present invention an optical assembly is provided that includes a substrate that has one or more optical waveguides. A component is coupled to and spaced apart from the substrate. The component has one or more photodetectors. One or more flexible optical pillars are disposed to be positioned between optical waveguides and the photodetectors. The flexible optical pillars are aligned by one or more alignment structures. The flexible optical pillars are optically transmissive and configured to transmit light from the optical waveguides to the photodetectors.

Certain embodiments of the invention may provide one or more technical advantages. A technical advantage of one embodiment may include alignment structures for flexible optical pillars. In contrast with other assembly structures, alignment structures enable significant improvement of the alignment tolerances and thus make the assembly process more stable and reliable. The improved alignment tolerances may reduce the effective cost of the assembly and provide significant improvement of the system performance due to improved coupling between waveguides and assembled optical devices.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1-7 of the drawings, like numerals being used for like and corresponding parts of the various drawings.

Figure 1:
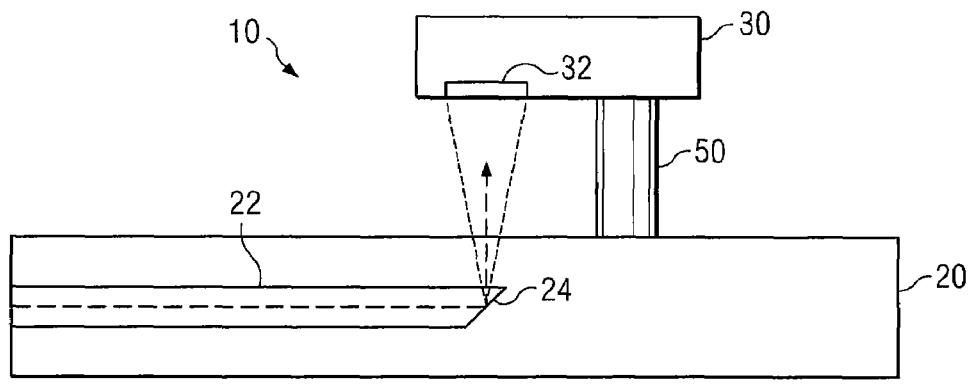
FIG. 1 is a diagram illustrating an example optical assembly.

FIG. 1 is a diagram illustrating an example optical assembly 10. Optical assemblies, such as assembly 10, are devices in which one or more components (e.g., chips) are coupled to a substrate by one or more mechanical supports. The substrate has optical waveguides, which may transmit light to an array of photodetectors located on the component. However, any displacement within the optical assembly (such as a lateral shift of the component relative to the substrate) may cause optical power loss, which can deteriorate the performance of the optical assembly. For example, a lateral shift may be caused by mechanical or thermal stresses, such as those caused by a CTE mismatch between the substrate and the component. Such lateral shift may lead to misalignment of optical components, causing optical signal degradation or failure.

As described in more detail below in conjunction with FIGS. 2-7, one or more flexible optical pillars may be positioned between the optical waveguides and the photodetectors. The flexible optical pillars may reduce light divergence and optical power loss. The flexible optical pillars may compensate for the movement of the component with respect to the substrate, thereby keeping the component and substrate optically coupled. Although the flexible optical pillars may compensate for misalignment of assembled devices, flexible optical pillars, by themselves, may not compensate for misalignment displacement during the assembly process. Therefore, as described in more detail below, the flexible optical pillars are aligned during assembly by one or more alignment structures, thereby keeping the component and substrate optically coupled. Optically coupled, as it is referred to in this disclosure, refers to transmitting at least one light beam in an optical assembly from one structure to another structure in a manner that maintains the integrity of the light beam.

As shown in FIG. 1, assembly 10 includes a substrate 20 and a component 30. Substrate 20 is coupled to component 30 by one or more mechanical supports 50. It should be noted that although selected components are illustrated in FIGS. 1-6 at a high level, other materials and coupling techniques might be used. Moreover, the optical assemblies may include any other well-known components and the techniques described herein may be applied to many varieties of semiconductor assemblies such as component on component, electro-optic component on chip, and micro-electro-mechanical systems (MEMS) on chip, for example.

Substrate 20 may comprise any suitable surface and may comprise any suitable ceramic or organic material. For example, substrate 20 may refer to a base substrate that comprises a plastic surface mount for component 30 (also referred to as a package). As another example, substrate 20 may comprise a semiconductor chip that also acts as a substrate for component 30. In the illustrated embodiment, substrate 20 has one or more optical waveguides 22.

Waveguide 22 may refer to any suitable structure to propagate light. For example, waveguide 22 may include a structure integrated into substrate 20 with layers of different refractive indices to propagate light. Waveguide 22 includes at least one mirror 24 that redirects light. Mirror 24 may comprise any suitable material operable to reflect light. According to various embodiments, mirror 24 may be replaced with a grating or other element enabling light redirection.

Component 30 may comprise any suitable device operable to perform data processing. For example, component 30 may perform data transmission using electric signals. Component 30 may refer to a silicon chip, semiconductor chip, microelectronic chip, optoelectronic chip, MEMS chip, microchip die, integrated circuit, or any other suitable data processing device.

Component 30 has one or more photodetectors 32 that convert light to an electronic signal. According to various embodiments, component 30 and photodetector 32 are optically coupled to waveguide 22 on substrate 20. Thus, light from waveguide 22 and mirror 24 propagates in free space between substrate 20 and component 30 and is received at photodetector 32.

Mechanical support 50 may comprise any suitable material operable to couple component 30 and substrate 20. According to various embodiments, mechanical support 50 may comprise a polymer-based material, for example. According other embodiments, mechanical support 50 may comprise a solder bump comprised of any suitable conductive material such as gold, tin, lead, or copper, for example. According to yet other embodiments, mechanical support 50 may be replaced by other types of supports such as microelectronic interconnections, optical interconnections, or any other suitable support.

As described in more detail below, component 30 may move with respect to substrate 20, which may reduce the reliability of assembly 10. Any displacement of component 30 relative to substrate 20 may cause optical power loss. For example, a lateral shift of component 30 relative to substrate 20 may cause light divergence, which may deteriorate the performance of assembly 10. The lateral shift can be caused by mechanical or thermal stresses, as examples.

Figure 2:
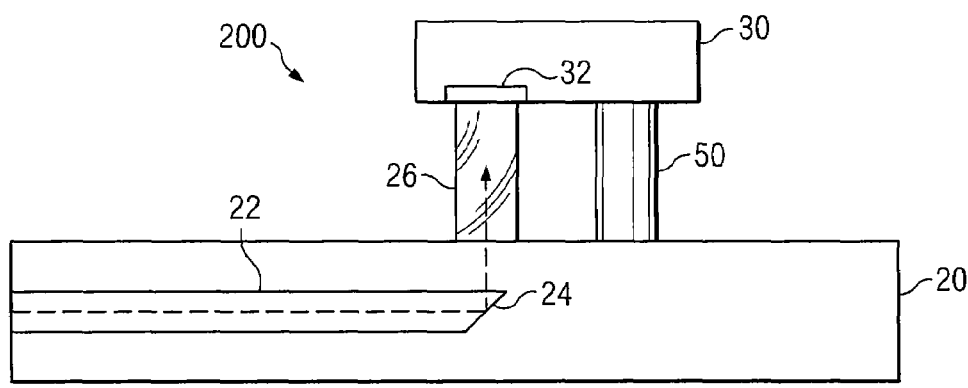
FIG. 2 is a diagram illustrating the optical assembly of FIG. 1 with a flexible optical pillar, in accordance with one embodiment of the present invention.

FIG. 2 is a diagram illustrating optical assembly 200 of FIG. 1 with a flexible optical pillar 26. According to particular embodiments of the present invention, flexible optical pillar 26 reduces light divergence. For example, flexible optical pillar 26 may comprise an optically transmissive protrusion disposed between optical waveguides 22 and photodetectors 32.

Flexible optical pillar 26 may be disposed in a set of one or more flexible optical pillars 26. Flexible optical pillar 26 may have any suitable shape and dimensions. For example, flexible optical pillars 26 that are 150 um in height and 50 um in diameter may double the displacement tolerances (compared to the design of FIG. 1) when the distance between the waveguide and the photodetector is 50 um.

Figures 3A, 3B:
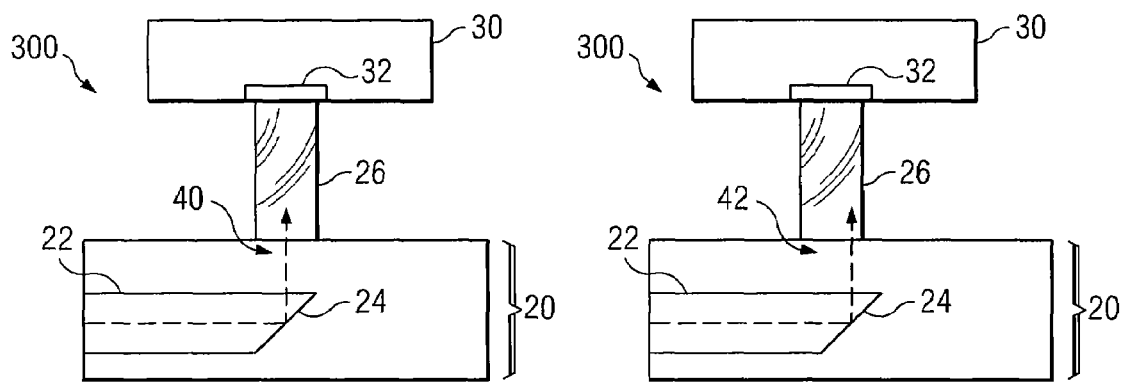
FIG. 3A is a diagram illustrating an example optical assembly with a flexible optical pillar aligned between the optical waveguide and the photodetector, in accordance with one embodiment of the present invention.
FIG. 3B is a diagram illustrating an example optical assembly with a misaligned flexible optical pillar.

Moreover, although the illustrated embodiments in FIGS. 2-3B show flexible optical pillar 26 with a rectangular cross-section, flexible optical pillar 26 may have any suitable shape, such as a rounded, square, triangular, or polygonal cross-section. Indeed, the present disclosure contemplates many different shapes and compositions of flexible optical pillar 26. Various embodiments may include, some, all, or none of the enumerated shapes and compositions.

According to one embodiment of the invention, flexible optical pillar 26 may be disposed by photopatterning or etching. For example, a resist material may be deposited on substrate 20 and/or component 30. The resist material is then photopatterned to leave protrusions disposed on substrate 20 and/or component 30 that comprise flexible optical pillar 26.

According to another embodiment, flexible optical pillar 26 may be disposed on substrate 20 and/or component 30 by bonding each flexible optical pillar 26 with an epoxy or any other similar material. However, the present disclosure contemplates many types of techniques for disposing flexible optical pillar 26 on substrate 20 and/or component 30. Various embodiments may include, some, all, or none of the enumerated techniques.

FIG. 3A is a diagram illustrating optical assembly 300 with a flexible optical pillar 26 aligned between the optical waveguide 22 and photodetector 32, in accordance with one embodiment of the present invention. As indicated by reference number 40, flexible optical pillar 26 is aligned to transmit light from optical waveguide 22 to photodetector 32. According to one embodiment, flexible optical pillar 26 may compensate for the movement of component 30 with respect to substrate 20. However, although flexible optical pillar 26 may compensate for misalignment of optical assembly 300, it may not compensate for misalignment displacement during the assembly process of optical assembly 300 as described below with reference to FIG. 3B.

FIG. 3B is a diagram illustrating optical assembly 300 with a misaligned flexible optical pillar 26. In the illustrated embodiment, flexible optical pillar 26 is misaligned during the assembly. As indicated by reference number 42, flexible optical pillar 26 has been laterally shifted relative to optical waveguide 22. This misalignment may result in reduction of the coupling efficiency, resulting in optical power loss. Keeping component 30 and substrate 20 optically coupled during assembly with alignment structures reduces optical power loss at assembly 300. Further details of particular embodiments of the present invention are provided below with reference to FIGS. 4-7.

Figure 4A:
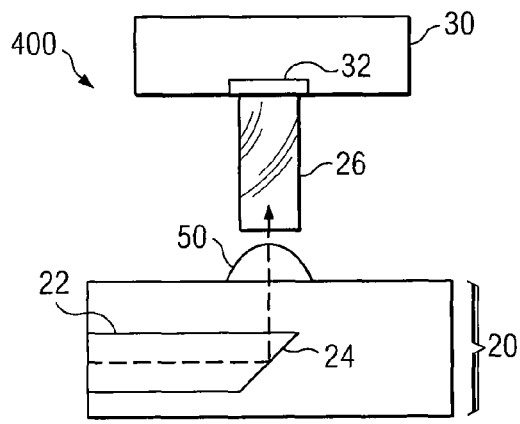
FIG. 4A is a diagram illustrating a flexible optical pillar and an example alignment structure, in accordance with one embodiment of the present invention.

FIG. 4A is a diagram illustrating flexible optical pillar 26 and an example alignment structure 50, in accordance with one embodiment of the present invention. According to one embodiment, alignment structure 50 comprises an optically transmissive liquid bump disposed on the surface of substrate 20. According to one embodiment, alignment structure 50 may be configured to transmit light from optical waveguide 22 to flexible optical pillar 26. According to other embodiments, alignment structure 50 may comprise any suitable liquid material (e.g., a material in a deformable state) that may have good wetting properties with the material forming flexible optical pillar 26 so that an optical bridge may be formed between substrate 20 and flexible optical pillar 26. According to yet other embodiments, flexible optical pillar 26 may be disposed on substrate 20 and alignment structure 50 may be disposed on the surface of component 30.

Figure 4B:
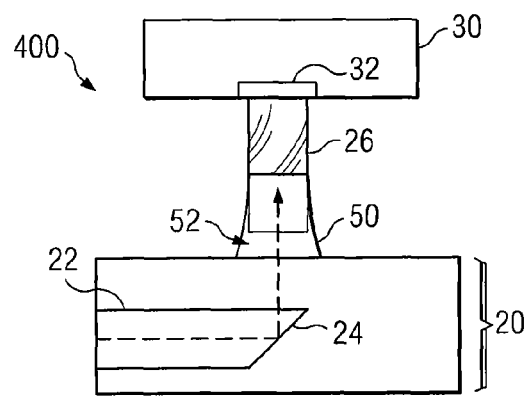
FIG. 4B is a diagram illustrating a flexible optical pillar coupled to the alignment structure of FIG. 4A, in accordance with one embodiment of the present invention.

FIG. 4B is a diagram illustrating flexible optical pillar 26 coupled to alignment structure 50 of FIG. 4A, in accordance with one embodiment of the present invention. According to the illustrated embodiment, flexible optical pillar 26 is coupled to alignment structure by immersing flexible optical pillar 26 in alignment structure 50. According to one embodiment, coupling optical pillar 26 with alignment structure 50 may cause at least a portion of alignment structure 50 to run up on the sidewalls of flexible optical pillar 26 and form an optical bridge, as indicated by reference number 52. According to one embodiment, alignment structure 50 may be cured. For example, alignment structure 50 may be cured with Ultraviolet (UV) light. As another example, alignment structure 50 may be cured with thermal treatment.

According to one embodiment, a flexible connection may be formed between substrate 20 and component 30 by flexible optical pillar 26 and alignment structure 50. This combined flexible optical pillar 26 and alignment structure 50 may compensate for the movement of component 30 with respect to substrate 20, thereby keeping component 30 and substrate 20 optically coupled, thus reducing optical power loss. According to particular embodiments, alignment structure 50 and flexible optical pillar 26 may have a high refractive index difference between the pillar material and air. Therefore, light may be confined in alignment structure 50 and flexible optical pillar 26.

Figure 4C:
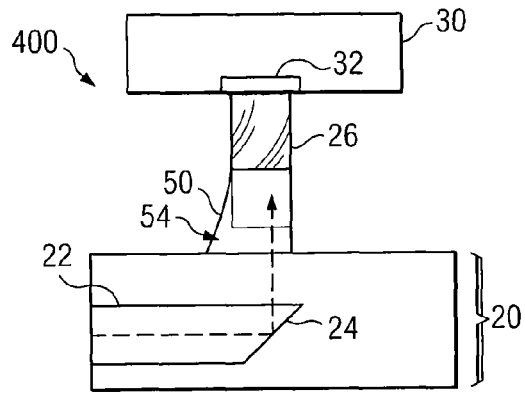
FIG. 4C is a diagram illustrating the flexible optical pillar and the alignment structure of FIG. 4A compensating for misalignment during assembly, in accordance with one embodiment of the present invention.

FIG. 4C is a diagram illustrating flexible optical pillar 26 and alignment structure 50 of FIG. 4A compensating for misalignment during assembly, in accordance with one embodiment of the present invention. According to the illustrated embodiment, flexible optical pillar 26 is coupled to alignment structure by immersing flexible optical pillar 26 in alignment structure 50, and flexible optical pillar 26 unintentionally shifted in the lateral direction during or before immersion. According to the illustrated embodiment, the shift is still within the dimension of alignment structure 50 and alignment structure 50 is in contact with flexible optical pillar 26, as indicated by reference number 54. According to one embodiment, the formed optical bridge may be asymmetric and may confine the light and guide it to flexible optical pillar 26. According to one embodiment, alignment structure 50 may be cured after the flexible optical pillar 26 placement is completed.

According to one embodiment, to allow the optical bridge to come in contact with flexible optical pillar 26 in case of a large misalignment during immersion, the assembly process may be conducted in two steps. First, flexible optical pillar 26 may be brought down in full contact with substrate 20, so that the liquid of alignment structure 50 may contact flexible optical pillar 26 and run up flexible optical pillar 26. Next, component 30 may be moved vertically a small distance allowing the optical bridge to stretch so that an optical connection is formed.

According to one embodiment, the alignment compensation described above may allow misalignments between flexible optical pillar 26 and waveguide 22 and/or photodetector 32 and reduce or eliminate power loss caused by such misalignments. As an example only, if the diameter of flexible optical pillar 26 is 20 um, then moving flexible optical pillar 26 laterally by 10 um without compensation may cause complete loss of the optical signal if alignment structure 50 is not used. However, if alignment structure 50 described above is used, then moving flexible optical pillar 26 by 10 um laterally may allow flexible optical pillar 26 to couple to alignment structure 50, thereby enabling formation of an optical bridge. Moving photodetector 32 with flexible optical pillar 26 by 10-20 um vertically from substrate 20 may form an optical bridge with sidewalls sloped less than 45 degrees relative to the substrate and, therefore, the light may propagate from waveguide 22 to photodetector 32 with minimal leakage through the sidewalls.

Figure 5A:
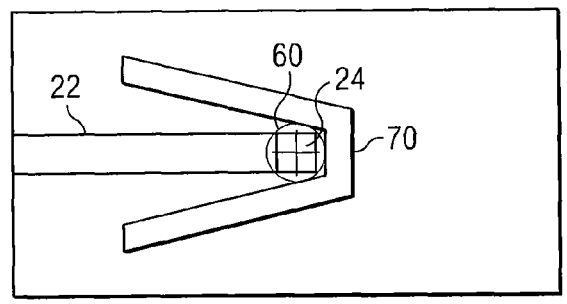
FIG. 5A is a diagram illustrating another example alignment structure, in accordance with one embodiment of the present invention.
Figure 5B:
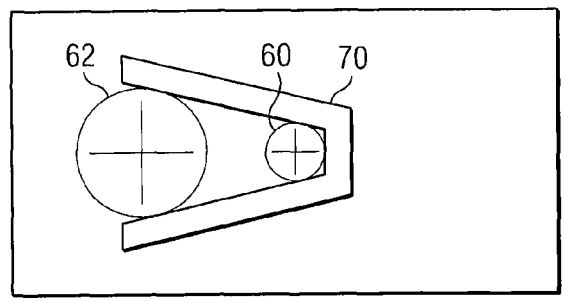
FIG. 5B is a diagram illustrating alignment zones for the alignment structure of FIG. 5A, in accordance with one embodiment of the present invention.

FIG. 5A is a diagram illustrating another example alignment structure 70, in accordance with one embodiment of the present invention. According to the illustrated embodiment, a targeted alignment zone 60 may indicate the size of flexible optical pillar 26 and thus also shows an alignment zone for flexible optical pillar 26 over mirror 24. For example, flexible optical pillar 26 may be placed in targeted alignment zone 60 in order to avoid possible optical power losses due to misalignment of flexible optical pillar 26. As described above, targeted alignment zone 60 may be the same size as flexible optical pillar 26, and thus any misalignment beyond targeted alignment zone 60 may lead to power loss.

According to one embodiment, an alignment structure 70 that comprises a lateral wedge improves the alignment of flexible optical pillar 26. According to one embodiment, the lateral wedge comprises at least one narrow portion and at least one wide portion. Alignment structure 70 may be formed on the top surface of substrate 20 and/or component 30. According to one embodiment, alignment structure 70 may be photopatterned or etched. For example, a resist material may be deposited on substrate 20 and/or component 30. The resist material is then photopatterned to leave alignment structure 70 disposed on substrate 20 and/or component 30.

According to one embodiment, the narrow portion of alignment structure 70 may define targeted alignment zone 60 and may have same size as targeted alignment zone 60. According to one embodiment, the wide portion of alignment structure 70 may define an increased alignment zone, such as increased alignment zone 62 illustrated in FIG. 5B. Indeed, the present disclosure contemplates many different arrangements and alignment zones of alignment structure 70. Various embodiments may include, some, all, or none of the enumerated alignment zones and arrangements. As described below, increased alignment zone 62 facilitates alignment into targeted alignment zone 60.

Figure 5C:
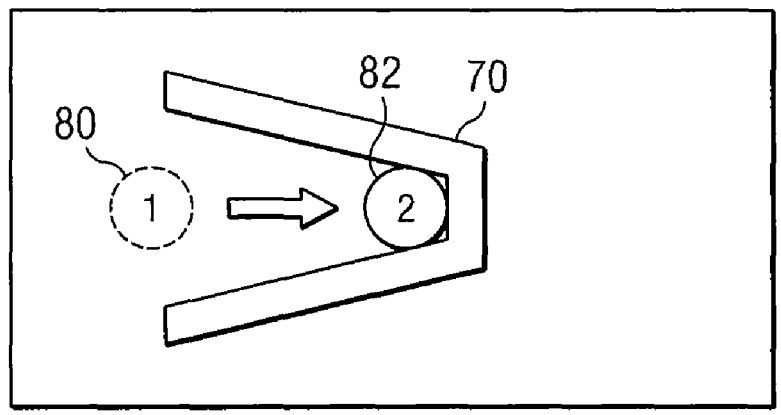
FIG. 5C is a diagram illustrating a top perspective and a side perspective of alignment of the optical assembly with the alignment structure of FIG. 5A, in accordance with one embodiment of the present invention.
Figure 5C:
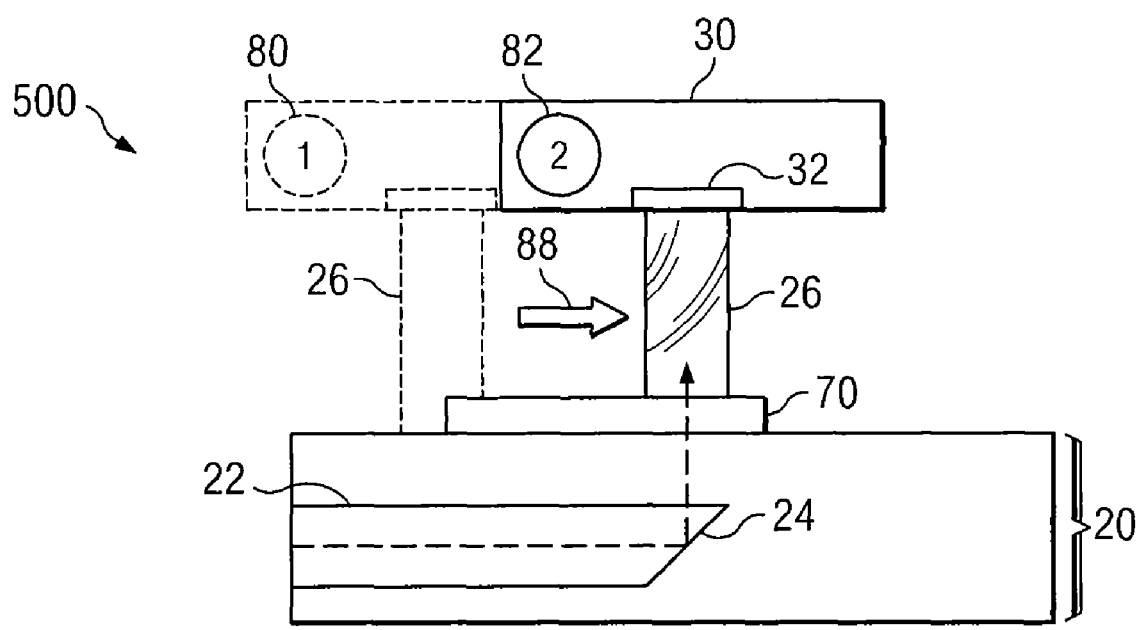

FIG. 5C is a diagram illustrating a top perspective and a side perspective of alignment of optical assembly 500 with alignment structure 70 of FIG. 5A, in accordance with one embodiment of the present invention. According to the illustrated embodiment, at step 1 (indicated by reference number 80) component 30 with flexible optical pillar 26 may be positioned in the increased alignment zone of alignment structure 70. According to one embodiment, component 30 may be moved in contact with substrate 20. According to another embodiment, component 30 may be moved close to but slightly spaced apart from substrate 20. According to yet another embodiment, flexible optical pillar 26 may be disposed on substrate 20 and may be positioned in an increased alignment zone on component 30.

According to the illustrated embodiment, at step 2 (indicated by reference number 82) component 30 with flexible optical pillar 26 is moved laterally to the position of the targeted alignment zone, as indicated by reference number 88. Thus, flexible optical pillar 26 may be aligned and may provide improved coupling between optical waveguide 22 and photodetector 32.

Figure 6A:
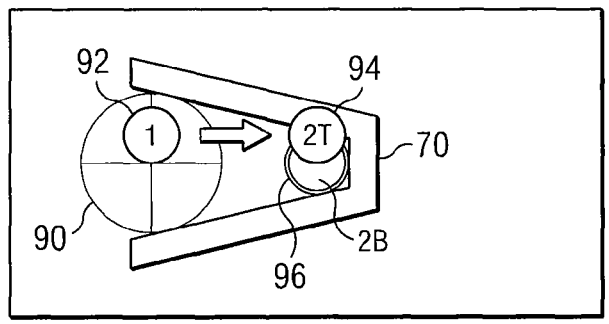
FIG. 6A is a diagram illustrating a top perspective of an alignment structure and a flexible optical pillar compensating for the movement of the component with respect to the substrate, in accordance with one embodiment of the present invention.
Figure 6B:
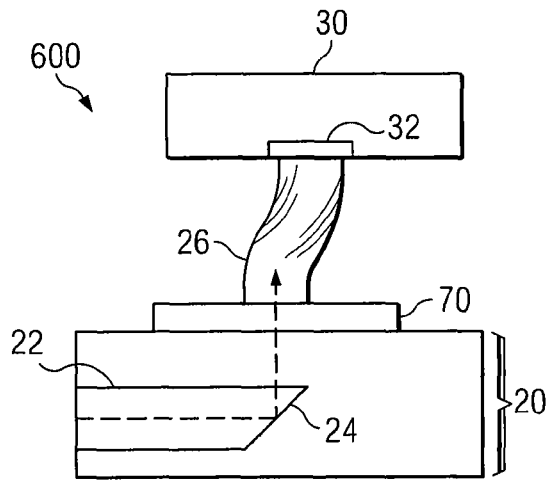
FIG. 6B is a diagram illustrating a side perspective of the alignment structure and flexible optical pillar of FIG. 6A compensating for the movement of the component with respect to the substrate, in accordance with one embodiment of the present invention.

FIG. 6A is a diagram illustrating a top perspective and FIG. 6B is a diagram illustrating a side perspective of alignment structure 70 and flexible optical pillar 26 compensating for the movement of component 30 with respect to substrate 20, in accordance with one embodiment of the present invention. According to the illustrated embodiments, in the case misalignment during assembly of optical device 600, alignment structure 70 may compensate for the misalignment. For example, at step 1 (as indicated by reference number 92 in FIG. 6A), flexible optical pillar 26 is misaligned from the center of increased alignment zone 90 but still within the radius of increased alignment zone 90. In step 2B (as indicated by reference number 96) flexible optical pillar 26 is moved laterally to the position of targeted alignment zone 96.

According to the illustrated embodiment in FIG. 6B, component 30 shifted and photodetector 32 shifted to the position indicated by position 2T and reference number 94 in FIG. 6A. For example, component 30 may have unintentionally shifted lateral to substrate 20 during or after assembly. According to one embodiment, alignment structure 70 maintains the alignment of flexible optical pillar 26 if either substrate 20 and/or component 30 shifts laterally. According to other embodiments, flexible optical pillar 26 may compensate for the lateral movement by deforming.

Thus, as described above, the alignment structure 70 may improve the alignment tolerance with an increased alignment zone that facilitates alignment into a targeted alignment zone. Therefore, alignment structures may enable significant improvement of the alignment tolerances and thus make the assembly process more stable and reliable. The improved alignment tolerances not only reduce the effective cost of the assembly but also provide significant improvement of the system performance due to improved coupling between waveguides and assembled optical devices.

Figure 7:
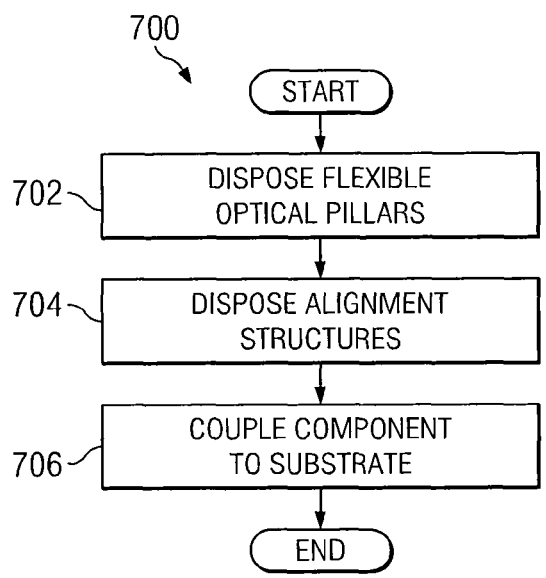
FIG. 7 is a flow diagram illustrating an example method for providing an optical assembly, in accordance with one embodiment of the present invention.

FIG. 7 is a flow diagram illustrating an example method 700 for providing an optical assembly, in accordance with one embodiment of the present invention. The example method begins at step 702 where one or more flexible optical pillars are disposed on a component. According to one embodiment, the component has one or more photodetectors. According to one embodiment, the flexible optical pillars are optically transmissive and configured to transmit light to the photodetectors.

At step 704, one or more alignment structures are disposed on a substrate. According to one embodiment, the alignment structures may include an optically transmissive liquid bump disposed on the surface of the substrate, such that an optical bridge may be formed between the substrate and each of the flexible optical pillars. According to one embodiment, the alignment structure may include lateral wedges with at least one narrow portion and at least one wide portion. The wide portion may define an increased alignment zone and that facilitates alignment into targeted alignment zone defined by the narrow portion. According to one embodiment, the substrate may refer to a base substrate that includes a plastic surface mount for a component (also referred to as a package). As another example, the substrate may include a semiconductor chip. Each optical waveguide may include at least one mirror that redirects light.

At step 706, the component is coupled to the substrate such that the one or more alignment structures align each of the one or more flexible optical pillars. According to one embodiment, the alignment structures may enable significant improvement of the alignment tolerances and thus make the assembly process more stable and reliable.

It should be understood that some of the steps illustrated in FIG. 7 may be combined, modified, or deleted where appropriate, and additional steps may be added to the flow diagram. Additionally, as indicated above, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of components included within the optical assemblies, other and different components may be utilized to accommodate particular needs. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for providing an optical assembly, comprising:
    disposing one or more alignment structures on a first element, the one or more alignment structures comprising one or more lateral wedges, each lateral wedge comprising at least one narrow portion that defines a targeted alignment zone and at least one wide portion that defines an increased alignment zone;
    disposing one or more flexible optical pillars on a second element, the flexible optical pillars being optically transmissive and configured to transmit light; and
    coupling the second element to and spaced apart from the first element such that the one or more alignment structures align each of the one or more flexible optical pillars, wherein coupling the second element to and spaced apart from the first element comprises:
        placing each of the flexible optical pillars in one or more increased alignment zones defined by the lateral wedges; and
        moving the flexible optical pillars from the increased alignment zones to one or more targeted alignment zones defined by the lateral wedges.

2. The method of claim 1, wherein disposing one or more flexible optical pillars on the second element comprises photopatterning polysiloxane.

3. The method of claim 1, wherein disposing one or more alignment structures on the first element comprises disposing one or more optically transmissive liquid bumps on the first element.

4. The method of claim 1, wherein coupling the second element to and spaced apart from the first element such that the one or more alignment structures align each of the one or more flexible optical pillars comprises:
- immersing each of the flexible optical pillars in one or more optically transmissive liquid bumps; and
- curing the one or more optically transmissive liquid bumps to form one or more optical bridges between the first element and the flexible optical pillars.

5. The method of claim 1, wherein the second element is coupled to the first element by one or more mechanical supports.

6. The method of claim 1, wherein the first element comprises a base substrate and the second element comprises a silicon chip.

7. The method of claim 1, wherein the second element comprises a base substrate and the first element comprises a silicon chip.

\* \* \* \* \*